US009625567B2

(12) United States Patent
Lim

(10) Patent No.: US 9,625,567 B2
(45) Date of Patent: Apr. 18, 2017

(54) POSITIONING SYSTEM USING SOUND WAVES

(71) Applicant: Dong-Kwon Lim, Seoul (KR)

(72) Inventor: Dong-Kwon Lim, Seoul (KR)

( * ) Notice: Subject to any disclaimer, the term of this patent is extended or adjusted under 35 U.S.C. 154(b) by 46 days.

(21) Appl. No.: 14/890,783

(22) PCT Filed: Mar. 7, 2014

(86) PCT No.: PCT/KR2014/001905
§ 371 (c)(1),
(2) Date: Nov. 12, 2015

(87) PCT Pub. No.: WO2014/142478
PCT Pub. Date: Sep. 18, 2014

(65) Prior Publication Data
US 2016/0116569 A1    Apr. 28, 2016

(30) Foreign Application Priority Data
Mar. 12, 2013 (KR) .......................... 10-2013-0026400

(51) Int. Cl.
*G01S 5/30* (2006.01)
*G01S 5/26* (2006.01)
*G01S 15/89* (2006.01)

(52) U.S. Cl.
CPC ........ *G01S 5/30* (2013.01); *G01S 5/26* (2013.01); *G01S 15/89* (2013.01)

(58) Field of Classification Search
CPC ............... G01S 5/26; G01S 5/30; G01S 15/89
See application file for complete search history.

(56) References Cited

U.S. PATENT DOCUMENTS

| 2008/0304361 | A1* | 12/2008 | Peng ....................... G01S 15/74 367/127 |
| 2009/0262604 | A1 | 10/2009 | Funada |
| 2013/0029685 | A1* | 1/2013 | Moshfeghi ............. G01S 19/48 455/456.1 |
| 2013/0029686 | A1* | 1/2013 | Moshfeghi ............. G01S 19/48 455/456.1 |
| 2016/0116569 | A1* | 4/2016 | Lim ........................ G01S 5/26 367/117 |
| 2016/0309289 | A1* | 10/2016 | Moshfeghi ............. G01S 19/48 |

FOREIGN PATENT DOCUMENTS

| CN | 105209930 A * | 12/2015 | ............... G01S 5/30 |
| KR | 20050058787 A | 6/2005 | |
| KR | 20060099580 A | 9/2006 | |

(Continued)

OTHER PUBLICATIONS

International search report received in PCT/KR2014/001905 on Jul. 29, 2014, 4 pages.

*Primary Examiner* — Daniel Pihulic
(74) *Attorney, Agent, or Firm* — ARC IP Law, PC; Joseph J. Mayo

(57) ABSTRACT

Disclosed is a positioning system using sound waves. The system provides the current location of a user carrying a dedicated terminal or any portable equipment possessing a microphone and a speaker in real time by using sound waves propagating in slow speed in various indoor spaces such as shopping malls, museums, and art galleries where GPS signals are not received.

6 Claims, 6 Drawing Sheets

(56) References Cited

FOREIGN PATENT DOCUMENTS

| KR | 20090044276 A | 5/2009 | | |
|----|---|---|---|---|
| KR | 20130026400 A | 3/2013 | | |
| KR | 101303729 B1 * | 9/2013 | ............... | G01S 5/30 |
| KR | WO 2014142478 A1 * | 9/2014 | ............... | G01S 5/30 |
| WO | 2014142478 | 9/2014 | | |

* cited by examiner

POSITIONING SYSTEM USING SOUND WAVES

BACKGROUND OF THE INVENTION

Field of Invention

The present invention relates to a system for providing location information using sound waves. The present invention, in particular, relates to a positioning system using sound waves, capable of providing the current location of a user in real time by using sound waves travelling in slower speed than radio waves in various indoor spaces such as department stores, shopping malls, museums, and art galleries.

Background

In general, positioning systems to provide location-based services (LBS) may be classified into a network-based scheme using RF signal information of cellular stations over a mobile communication network and a GPS type positioning scheme using a GPS receiver.

The above schemes may be suitable for outdoor spaces that have a superior environment to receive radio waves, but they are not suitable for shadow areas of satellite signals such as indoor spaces. In addition, the above schemes may require highly priced transmitter-receivers and highly priced relaying devices. Furthermore, high-energy radio waves can be harmful to human body.

Accordingly, various references including Korea Unexamined Patent Publication No. 2005-95401 have suggested various devices capable of detecting the location of a 3-D space by using the transmission time of sound waves. In other words, the distance (S=V×T) is obtained by recording the time, when the sound wave is generated, and time spent until the sound wave reaches a destination, and the location is detected through a triangulation scheme.

However, the applicability of the conventional location determination technologies using sound waves may not be useful since they are used to simply detect a 3-D space itself.

Since GPS signals do not reach various indoor spaces such as department stores, shopping malls, museums, and art galleries, it's not easy to provide information of a facility or an object based on user's location information or to offer convenient navigation, route suggestions, and search facility functions.

As shown in the case of using the strength of radio wave signals generated from radio wave signaling devices nearby, positioning systems using radio wave signals can produce a great margin of error and can be affected by many variables, which may not be practically useful in many cases.

BRIEF SUMMARY OF THE INVENTION

Technical Problems

The present invention has been presented to solve the technical problems in the related art; and it is the object of the present invention to provide a positioning system using sound waves, capable of determining the current location of a user in real time by using sound waves travelling in slow speed in various indoor spaces such as department stores, shopping malls, museums, and art galleries.

In addition, the present invention provides a positioning system using sound waves, capable of providing various applications by indicating the current location of a user through a portable terminal, a map in which the floor plan of a building is displayed, and additional information of facilities or contents corresponding to each items on the map.

Solutions

To this end, a positioning system using sound waves according to the present invention is proposed. The system includes a plurality of node signal generators installed at fixed locations in an indoor space, respectively, to transmit sound waves in non-audible frequency bands that carries an identification number, absolute location information, relative location information, and time of signal generation of the node signal generators, and a portable terminal to receive the sound waves transmitted from the node signal generators, to calculate distances from the node signal generators by using a difference between the time of signal generation and the time of signal reception, to calculate the current location of the portable terminal by combining the calculated distances and the absolute location information, and to display the current location of the portable terminal on a display unit.

Preferably, each node signal generator includes a node memory to record the identification number, the absolute location information of the node signal generator, a node timer to provide the time of signal generation, a node sound wave generator to generate the non-audible sound wave that include an identification number and the absolute location information provided from the node memory, and the time of signal generation provided from the node timer, and a node speaker to transmit the sound wave generated from the node sound wave generator.

In addition, the node signal generator receives sound wave signals, which carries an identification number of the portable terminal and a signal generation time from the portable terminal and transmits the information to a management server along with the time at which the sound wave is received, and the management server calculates the current location of the portable terminal by using the identification number of the portable terminal, the time of signal generation, and the time at which the sound wave is received by the node signal generator.

In addition, the portable terminal includes a terminal microphone to receive the sound wave transmitted from the node signal generator, a terminal location calculation unit comprising a distance calculator, which calculates the distance from the node signal generator by using the difference between the time of signal generation received through the terminal microphone and the time of signal reception, and a location calculator which calculates the current location of the portable terminal by combining the calculated distance and the absolute location information, a terminal timer to provide the current time, when the sound wave is received, to the distance calculator of the terminal location calculation unit, a terminal memory to record therein a map representing a structure of the indoor space, and a display unit to map information of the current location of the portable terminal, which is provided by the terminal location calculation unit, on the map provided in the terminal memory, and display the map.

The system further includes a management server to record information of the current location of the portable terminal received from the node signal generator or the portable terminal.

The management server also provides a map representing a floor structure to the portable terminal.

In addition, the management server provides the descriptions of facilities in each section on the map or the descriptions of contents on the map to the portable terminal along with the map, and the portable terminal displays the map, the description, and the current location to the user.

Advantages of the Invention

As described above, according to the positioning system using the sound wave, the current location of a user can be informed in real time by using sound waves propagating at a slower velocity in various indoor spaces such department stores, shopping malls, museums, and art galleries.

In addition, various applications can be provided by indicating the current location of a user through a portable terminal, a map in which the floor plan of a building is displayed, and additional information of facilities or contents corresponding to each items on the map.

DETAILED DESCRIPTION OF THE INVENTION

Hereinafter, a positioning system using sound waves according to an exemplary embodiment of the present invention will be described in detail with reference to accompanying drawings.

In the following description, the term "indoor spaces" refers to various places such as department stores, shopping malls, museums, art galleries, and theaters.

Figure 1:
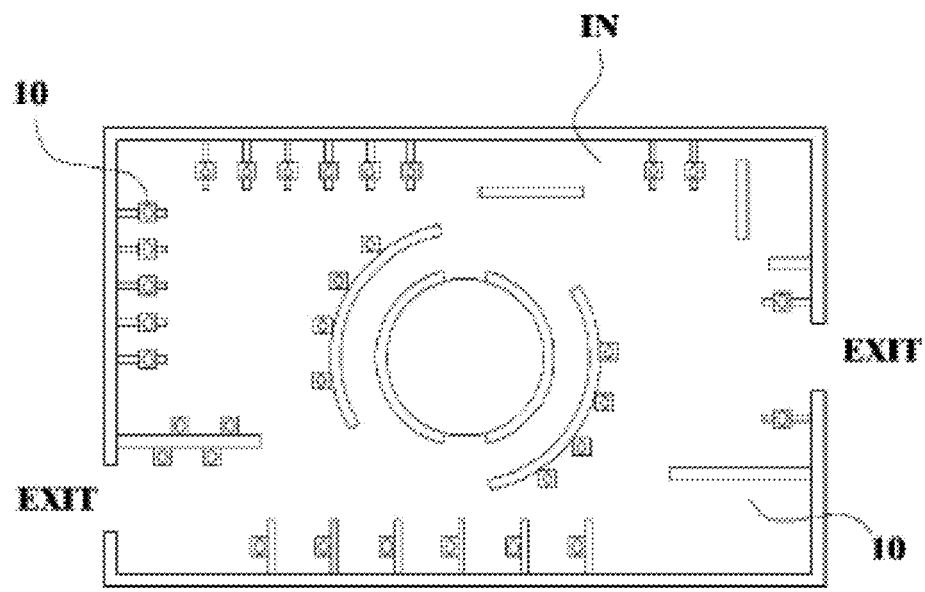
FIG. 1 is a view showing a map provided in the positioning system using sound waves according to the present invention.
Figure 2:
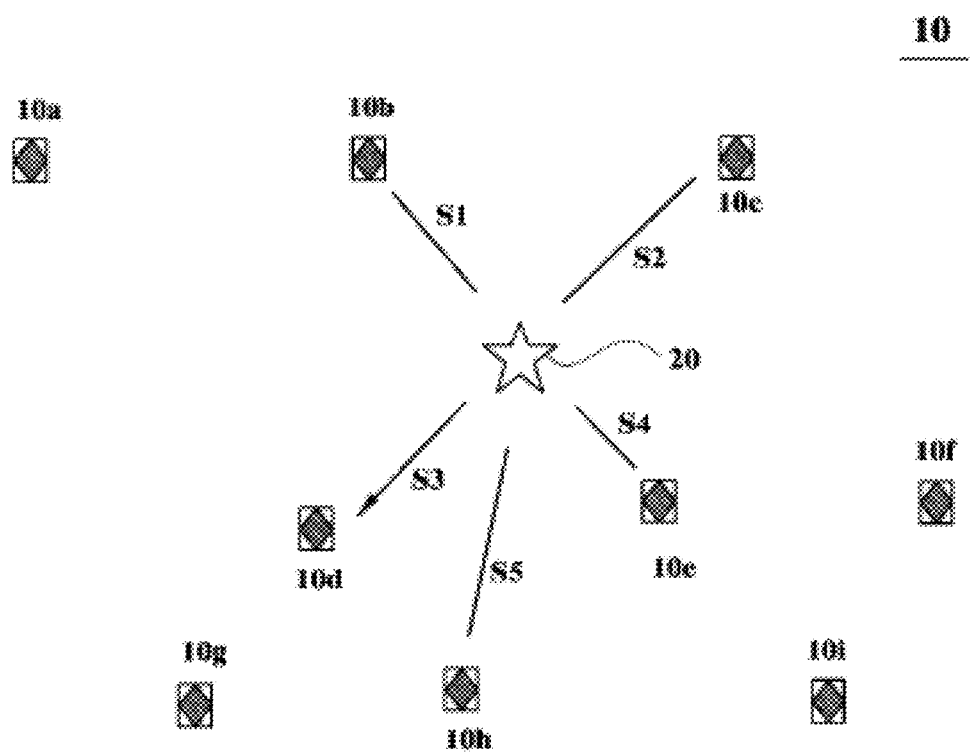
FIG. 2 is a view showing a scheme of calculating the location in the positioning system using sound waves according to the present invention.

As shown in FIG. 1, according to the present invention, node signal generators 10 are installed in fixed locations of indoor spaces. In addition, as shown in FIG. 2, a portable terminal 20, which is carried by a user, calculates the current location of the portable terminal 20 and informs the user of the current location thereof.

The portable terminal 20 can be a positioning terminal, which is especially manufactured for the application of the present invention, or a portable communication device such as a smart phone or a tablet PC carried by the user.

In the case of the smart phone or the tablet PC, the present invention may be applied by installing an additional application, and a microphone and a speaker embedded in the smart phone or the tablet PC may be utilized. The sound wave signals can be recognized with the typical portable communication devices accordingly.

To this end, the node signal generator 10 radiates a sound wave in non-audible frequencies, and the portable terminal 20 calculates the distance (s=v×t) between the node signal generator 10 and the portable terminal 20 by using the time (t) taken for the radiated sound wave to travel and the velocity (v) of the sound wave.

In addition, the current location of the portable terminal 20 is calculated based on the absolute location information of the node signal generator 10 and the distance (s) between the portable terminal 20 and the node signal generator 10 and provided. The current location of the portable terminal 20 is calculated through a triangulation scheme generally known to those skilled in the art, and the current location calculated is marked on the map m representing the internal structure of a museum and the like.

For example, when the user moves and positions at a specific location as shown in FIG. 2, distances S1 to S5 from five node signal generators 10b, 10c, 10d, 10e, and 10h close to the portable terminal 20 among several node signal generators 10a to 10i are calculated, and the current location of the portable terminal 20 is marked on the map.

Figure 3:
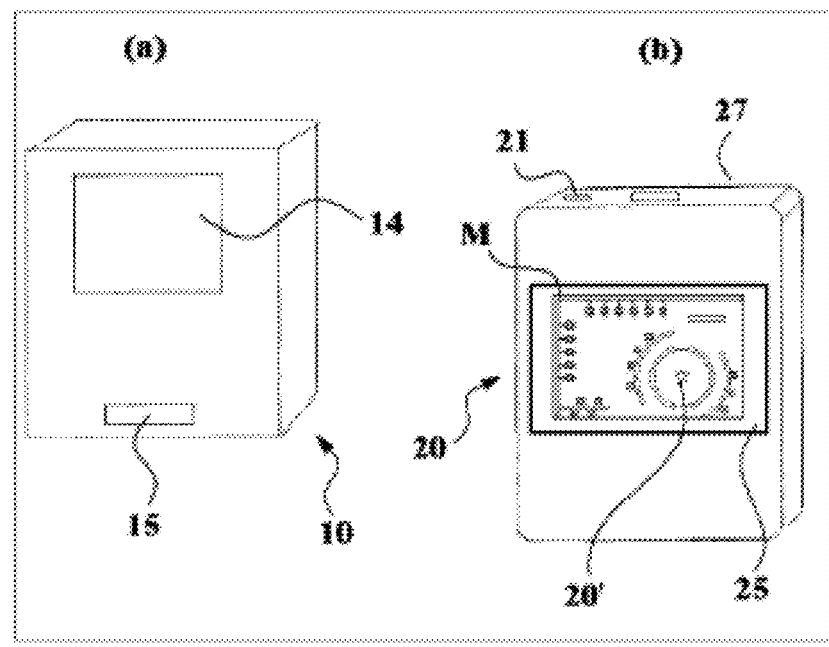
FIG. 3 is a view showing the structure of the positioning system using sound waves according to the present invention.

As shown in FIG. 3, the present invention provides the node signal generators 10 installed in fix locations to radiate sound waves and the portable terminal 20 to receive the sound wave radiated from the node signal generator 10 and calculate and display the current location of the portable terminal 20 so that the location information can be displayed. In addition, as needed, the present invention may additionally provide a management server 30.

The node signal generator 10 basically includes a node speaker 14 to radiate the sound wave to the portable terminal 20. In addition, the node signal generator 10 includes a node microphone 15 as described below to receive sound signals from the portable terminal 20.

The portable terminal 20 can be leased, for example, in a museum, and includes a terminal microphone 21 to receive sound waves from the node signal generator 10. The portable terminal 20 carries a display unit 25 to display a map m corresponding to the internal structure. On the map m, a current location 20' of the portable terminal 20 is marked (in the shape of a star). In addition, the portable terminal 20 carries a terminal speaker 27 behind as described below to radiate a sound signal to the node signal generator 10.

The management server 30 (see FIG. 6) traces and records the movement path of the portable terminal 20, and provides various kinds of services including the information of the map m to the portable terminal 20. Although not shown in FIG. 3, management servers 30 are installed in various kinds of places including a management office.

In more detail, each node signal generator 10 is installed at fixed locations of the indoor space to radiate a sound wave contains an identification number (ID_node), absolute location information, relative location information, and a signal generation time of the node signal generator.

Since a plurality of node signal generators 10 are provided, the node signal generator 10 have their own identification numbers (ID_node) so that the node signal generators 10 are distinguished from each other. The absolute location information includes the latitude, the longitude, and the altitude of a location in which each node signal generator 10 is installed. The signal generation time refers to a time when the sound wave is generated.

The latitude, the longitude, and the altitude used for the absolute location information is to enable a device to seamlessly work with other positioning systems such as global positioning system (GPS) when a user moves in and out of indoor spaces.

Figure 4:
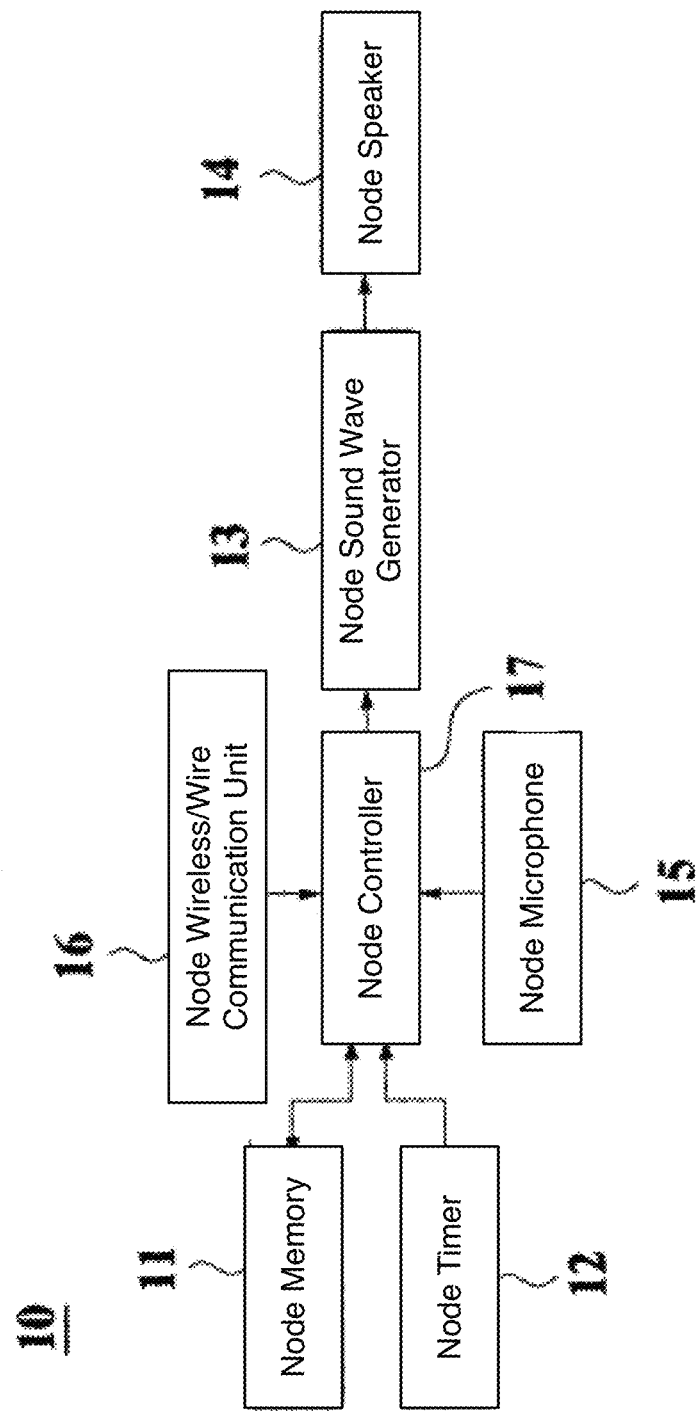
FIG. 4 is a block diagram showing the structure of a node signal generator in the positioning system using sound waves according to the present invention.

As shown in FIG. 4, the node signal generator 10 includes a node memory 11, a node timer 12, a node sound wave generator 13, a node speaker 14, a node microphone 15, a node wireless/wire communication unit 16, and a node controller 17.

The node memory 11 stores the identification number, the absolute location information, and the signal generation time that are described above. In addition, the node memory 11 may contain various application programs for the processing the node signal generator 10.

The node timer 12 is functions like a clock, and provides current time to the node controller 17, so that the node controller 17 can recognize the time of the sound wave generation.

The node sound wave generator 13 generates a non-audible sound wave and contains the identification number and the absolute location information provided from the node memory 11, and the signal generation time provided from the node timer 12.

The non-audible sound wave is used to prevent users in the indoor spaces from hearing the sound wave. The sound wave contains the various pieces of information including the identification number, which are obtained through various signal processing schemes and various signal modulation schemes.

The node speaker 14 radiates a sound wave generated from the node sound wave generator 13. Since the sound wave may be transmitted through an antenna or an ultra-sonic oscillator in addition to the speaker, an antenna or an ultra-sonic oscillator can also be used instead of the node speaker 14.

The node microphone 15 and the node wireless/wired communication unit 16 are added according to the need. The node microphone 15 receives the sound waves radiated from the portable terminal 20. The node wireless/wired communication unit 16 transmits the received sound waves to the management server 30.

In other words, the portable terminal 20 radiates a sound wave, which includes an identification number (ID_terminal) of the portable terminal 20 and a signal generation time (t_t), to the node signal generator 10. The node signal generator 10 adds a time (t_n), at which the sound wave is received, to the received sound wave and transmits the received sound wave having the time (t_n) to the management server 30.

Accordingly, separately from the case that the portable terminal 20 measures and provides the current location of a user, the management server 30 may also calculate current locations of the portable terminal 20 and manage the calculated current locations together.

Meanwhile, the node controller 17 controls the overall processes of the node signal generator 10 including the node memory 11, the node timer 12, the node sound wave generator 13, and the node wireless/wired communication unit 16.

Figure 5:
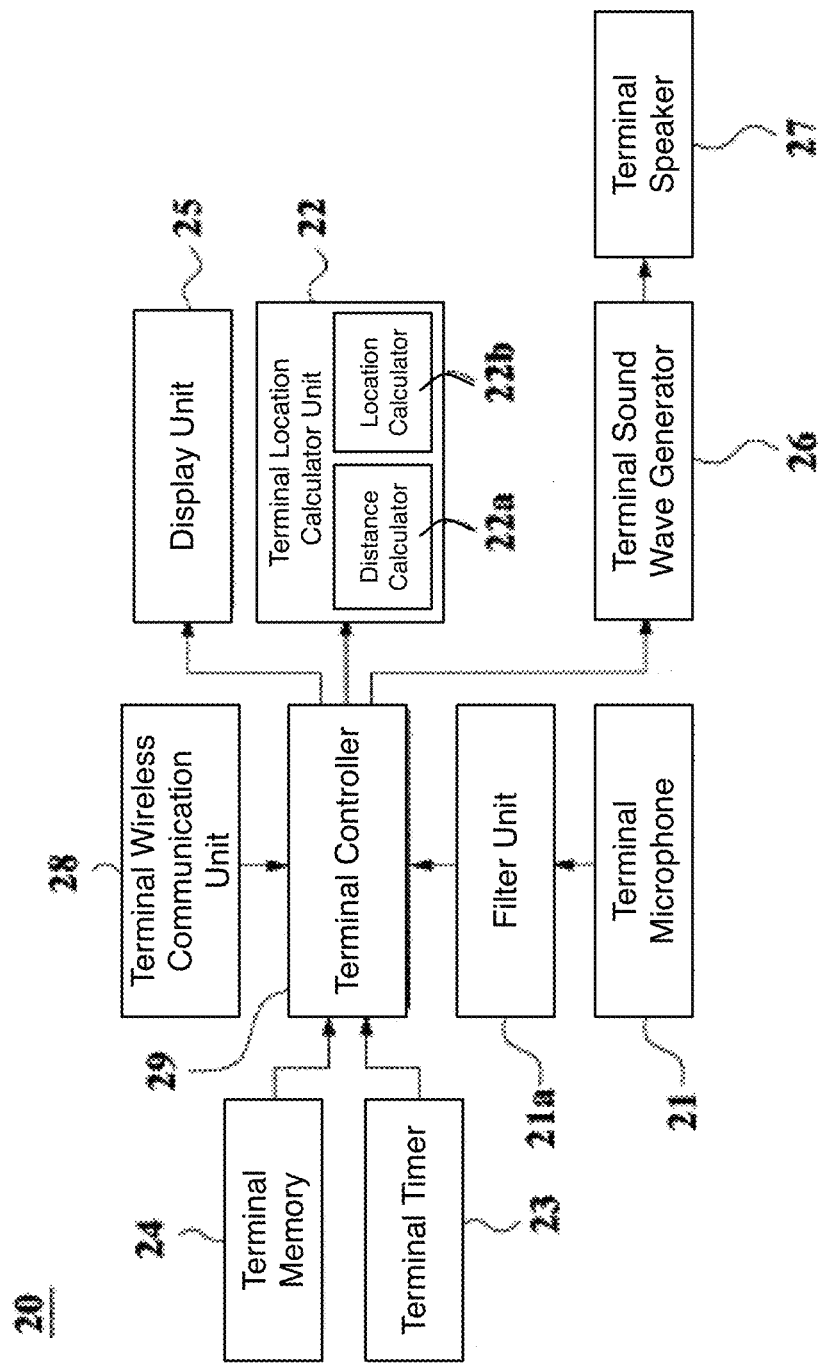
FIG. 5 is a block diagram showing the structure of a portable terminal in the positioning system using the sound waves according to the present invention.

The portable terminal 20 receives sound waves radiated from a plurality of node signal generators 10 and calculates the distances from the node signal generators 10 by using the differences between signal generation times and signal reception times. The portable terminal 20 calculates the current location thereof by combining the calculated distances and the absolute location information, and displays the calculated current location thereof on the display unit 25. As shown in FIG. 5, the portable terminal 20 includes a terminal microphone 21, a filter unit 21a, a terminal location calculation unit 22, a terminal timer 23, a terminal memory 24, a display unit 25, a terminal sound wave generator 26, a terminal speaker 27, a terminal wireless communication unit 28 and a terminal controller 29.

The terminal microphone 21 receives the sound wave radiated from the node signal generator 10. However, different kinds of sound wave receptors may be used instead of the terminal microphone 21.

The filter unit 21a filters sound waves received through the terminal microphone 21 to remove noises. A low noise amplifier (LNA), for example, may be used for the filter unit 21a.

The terminal location calculation unit 22 can calculate the current location of the portable terminal 20. For example, the terminal location calculation unit 22 carries a distance calculator 22a to calculate a distance and a location calculator 22b to calculate the current location based on the calculated distance.

The distance calculator 22a calculates the distance ($s = v \times t$) between the node signal generator 10 and the portable terminal 20 by using the difference ($t = t2 - t1$) between the signal generation time (t1) (i.e., time at which a sound wave is radiated from the node signal generator 10) contained in the sound wave and the signal reception time (t2) (i.e., time at which the sound wave is received in the portable terminal 20).

The location calculator 22b calculates the current location of the portable terminal 20 by combining calculated distances and the absolute location information. The location calculator 22b generally calculates distances from three close node signal generators 10, and takes into consideration the absolute location information along with the calculated distances to calculate the current location of the portable terminal 20 through generally-known triangulation schemes.

The current location of the portable terminal 20 in the indoor spaces may be determined by the terminal location calculation unit 22 that includes the distance calculator 22a and the location calculator 22b. The calculated current location of the portable terminal 20 is displayed on the display unit 250 as described below and notified to the user of the portable terminal 200.

The terminal timer 23 provides, the time when the sound wave is received, to the distance calculator 22a of the terminal location calculation unit 22, thereby calculating the distance between the node signal generator 10 and the portable terminal 20 as described above.

The terminal memory 24 basically records therein the map m showing the structure of the indoor space and the current location. Since the map m usually has the form of an image file, the map m is displayed on the display unit 25 through a predetermined signal processing scheme. In this case, the current location of the portable terminal 20 is mapped on the map m so that the current location (see 20' of FIG. 3) of the portable terminal 20 is displayed.

Various pieces of information corresponding to the map m are stored in the terminal memory 24. The various pieces of information include information of various facilities such as exits, parking lots, and facilities, and various contents that may include descriptions of objects or exhibits. The map m and the information are displayed on the display unit 25, so that various services can be provided to the user.

The display unit 25 may include an LCD panel. A touch screen may be installed in the display unit 25 for the convenience in use. The display unit 25 displays the map m representing the structure of the indoor space and various pieces of information. If the display unit 25 includes a touch screen, the user can touch a specific area to obtain the information needed.

The terminal sound wave generator 26 and the terminal speaker 27 are used to finally record the current location of the portable terminal 20 in the management server 30.

In other words, the terminal sound wave generator 26 generates a non-audible sound wave that include the identification number (ID_terminal) and the signal generation time (t_t) of the portable terminal 20. The terminal speaker 27 radiates the sound wave generated from the terminal sound wave generator 26.

The sound wave radiated from the portable terminal 20 is received by the node microphone 15, and the node signal generator 10 adds the time (t_n), when the sound wave is received, to the sound wave and transmits the sound wave that contains the time (t_n) to the management server 30 through the node wireless/wired communication unit 16. The management server 30 calculates the current location of the portable terminal 20 by using the sound wave that contains the time (t_n).

However, the portable terminal 20 may employ a scheme of directly transmitting information, which is subject to data signal processing, instead of the sound wave. In this case, a terminal wireless communication unit 28 can be used.

The management server 30 may receive information of the current location of the portable terminal 20 directly from the portable terminal 20 or through the node signal generator 10 in order to acquire the information of the current location of the portable terminal 20, and may employ any one of the above schemes.

In addition, the management server 30 may directly receive the current location calculated by the terminal location calculator 22 of the portable terminal 20, and may receive basic information used to calculate the location of the portable terminal 20 as well as the information of the identification number of the portable terminal 20, the sound wave generation signal, and the sound wave arrival signal.

The terminal wireless communication unit 28 is used for various communication purposes such as and not limited to reception of synchronization signal or node signaler information or the map m from the management server 30 or the transmission of current location data from or to the management server 30. The terminal controller 29 controls the overall processes of the related portable terminal 20.

The management server 30 to record the current location information of the portable terminal 20 is provided additionally.

Figure 6:
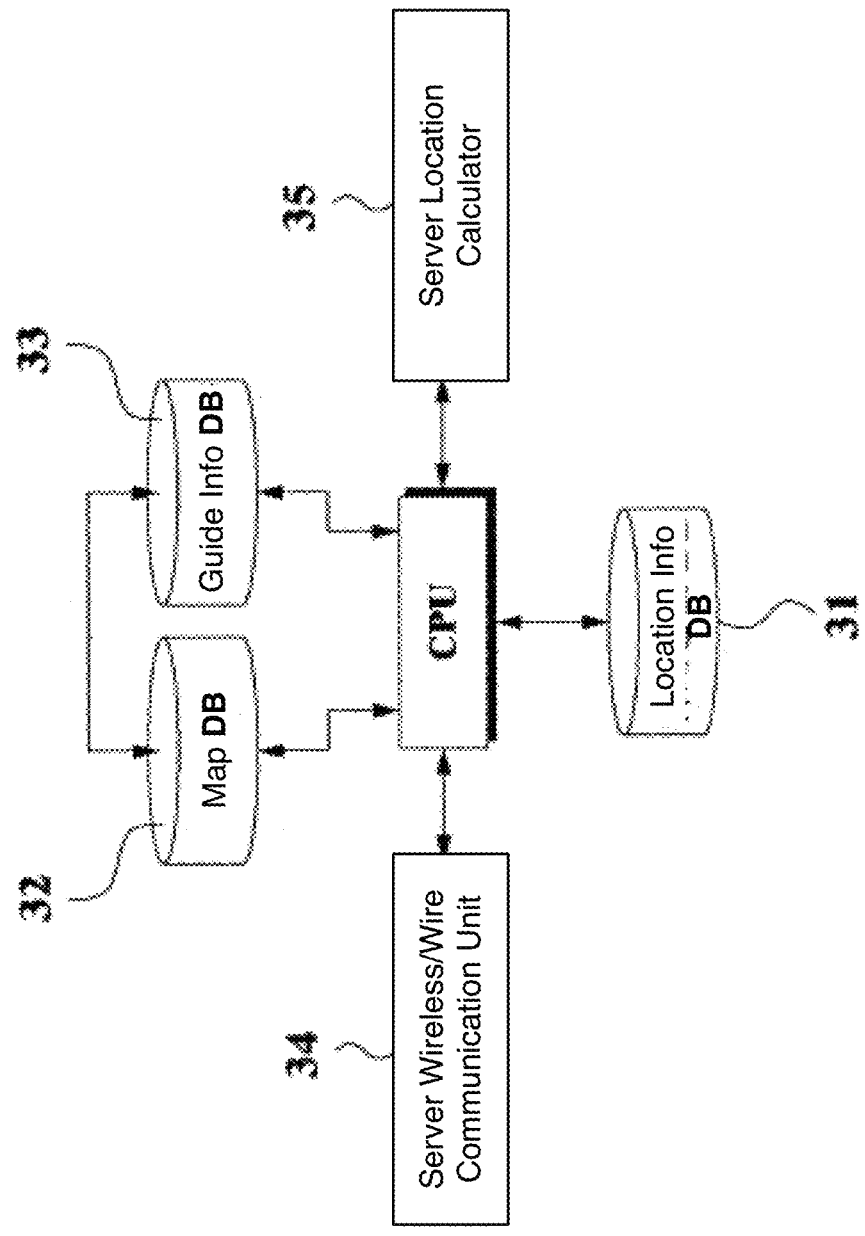
FIG. 6 is a block diagram showing the structure of a management server in the positioning system using sound waves according to the present invention.

As shown in FIG. 6, the management server 30 includes a location information database (DB) 31, a map DB 32, content DB 33, a wired/wireless communication unit 34, a server location calculator 35, and a CPU 36.

The location information DB 31 records therein the identification number and the current location of the portable terminal 200, which is carried by each user, minute by minute. Accordingly, the movement paths of several users can be observed.

The location information DB 31 may be used in various services such as a service of searching for missing children through using the current location of the portable terminal 20.

The map DB 32 stores the map m corresponding to the structure of the indoor space managed by the related management server 30. The map m stored in the map DB 32 is transmitted to the portable terminal 20 located in a remote place through the server wired/wireless communication unit 34. The map DB 32 stores the location and the identification number of the node signal generators 100 in the indoor space.

The content DB 33 stores information (or description) of various facilities or contents corresponding to locations on the map m, respectively, and then provides the information to the portable terminal 20 along with the map m.

The server location calculator 35 receives the identification number of the portable terminal 20 and the sound wave generation time from the node signal generator 10, and the sound wave reception time and the identification number of the node signal generator 10, so that the management server 30 calculates the current location of the portable terminal 20.

The CPU 36 controls the overall operations of the components of the management server 30 described above.

Although the system for providing location information according to the present invention has been described for illustrative purposes, those who are skilled in the art will appreciate that various modifications, additions and substitutions are possible, without departing from the scope and spirit of the invention as disclosed in the accompanying claims.

What is claimed is:

1. A positioning system using sound waves, comprising:
a plurality of node signal generators installed at fixed locations in an indoor space, respectively, to transmit a non-audible sound wave signal that carries an identification number, absolute location information, relative location information, and the time of signal generation of the node signal generators; and
a portable terminal to receive sound waves transmitted from node signal generators, to calculate distances from node signal generators by using the difference between the time of signal generation and the time of signal reception, to calculate a current location of the portable terminal by combining the calculated distances and the absolute location information, and to display the current location of the portable terminal on a display unit,
wherein each node signal generator comprises:
a node memory to record the identification number, the absolute location information of the node signal generator;
a node timer to provide the time of signal generation;
a node sound wave generator to generate the sound wave that carries the identification number and the absolute location information provided from the node memory, and the time of signal generation provided from the node timer; and
a node speaker to transmit the sound wave generated from the node sound wave generator.

2. The system of claim 1, wherein the node signal generator receives a sound wave, which comprises an identification number of the portable terminal and the time of signal generation, from the portable terminal and transmits the sound wave, which is transmitted from the portable terminal, to a management server together with the time when the sound wave is received, and
the management server that calculates a current location of the portable terminal by using the identification number of the portable terminal, the signal generation time, and the time at which the sound wave is received in the node signal generator.

3. The system of claim 1, wherein the portable terminal comprises:
a microphone to receive the sound wave transmitted from the node signal generator;
a location calculation unit comprising a distance calculator, which calculates a distance from the node signal generator by using the difference in time between the time of signal generation of the sound wave received through the microphone and the time of signal reception of the sound wave, and a location calculator which calculates the current location of the portable terminal by combining the calculated distance and the absolute location information;

a terminal timer to provide a current time, when the sound wave is received, to the distance calculator of the terminal location calculation unit;

a terminal memory to record therein a map representing a structure of the space; and a display unit to map the current location of the portable terminal, which is provided by the location calculation unit, on the map provided in the terminal memory and display the map.

4. The system of claim 1, further comprising a management server to record the current location of the portable terminal received from the node signal generator or the portable terminal.

5. The system of claim 4, wherein the management server provides a map representing a structure of the space to the portable terminal.

6. The system of claim 5, wherein the management server provides the descriptions of facilities in each section on the map or the descriptions of contents on the map to the portable terminal along with the map, and the portable terminal displays the map, descriptions, and the current location of the user.

* * * * *